(12) United States Patent
Walker et al.

(10) Patent No.: US 8,566,155 B2
(45) Date of Patent: *Oct. 22, 2013

(54) METHOD AND APPARATUS FOR ADMINISTERING A REWARD PROGRAM

(75) Inventors: Jay S. Walker, Ridgefield, CT (US); Andrew S. Van Luchene, Norwalk, CT (US); James A. Jorasch, Stamford, CT (US); Dean Alderucci, Ridgefield, CT (US)

(73) Assignee: Groupon, Inc., Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/616,662

(22) Filed: Sep. 14, 2012

(65) Prior Publication Data
US 2013/0018716 A1    Jan. 17, 2013

Related U.S. Application Data

(63) Continuation of application No. 11/946,435, filed on Nov. 28, 2007, now Pat. No. 8,280,769, which is a continuation of application No. 09/441,978, filed on Nov. 17, 1999, now abandoned, which is a continuation of application No. 08/961,964, filed on Oct. 31, 1997, now Pat. No. 6,049,778.

(51) Int. Cl.
*G06Q 30/00*  (2012.01)

(52) U.S. Cl.
USPC .................................................. 705/14.34

(58) Field of Classification Search
None
See application file for complete search history.

(56) References Cited

U.S. PATENT DOCUMENTS

| | | | |
|---|---|---|---|
| 4,750,119 A * | 6/1988 | Cohen et al. | ................ 705/14.34 |
| 4,876,592 A | 10/1989 | Von Kohorn | |
| 5,025,372 A | 6/1991 | Burton et al. | |
| 5,056,019 A | 10/1991 | Schultz et al. | |
| 5,200,889 A | 4/1993 | Mori | |
| 5,202,826 A | 4/1993 | McCarthy | |
| 5,237,498 A | 8/1993 | Tenma et al. | |
| 5,287,268 A | 2/1994 | McCarthy | |

(Continued)

FOREIGN PATENT DOCUMENTS

| | | |
|---|---|---|
| CA | 2364188 | 5/2002 |
| WO | WO 99/23596 | 5/1999 |

OTHER PUBLICATIONS

Gatignon, H., *Technology Diffusion: an Empirical Test of Competitive Effects*, Journal of marketing, Jan. 1989, 16 pp.

(Continued)

*Primary Examiner* — James W Myhre
(74) *Attorney, Agent, or Firm* — Alston & Bird LLP

(57) ABSTRACT

The method and apparatus for administering a reward program includes a central controller that stores a series of registrations, each of which corresponds to a purchaser of a product. The central controller calculates a measurement of product success, such as the number of products sold or the market share of the product, and determines if the measurement is within a predetermined range. The central controller may determine if the number of products sold exceeds a predetermined threshold, and a set of registrations are selected as "early-adopter" registrations that thereby define a set of early-adopter purchasers. The central controller may select a set of registrations having ordinal positions within a predetermined range of positions, so that early-adopter purchasers are defined. If the measurement of product success is within the predetermined range, a reward, such as a refund or a free product, may be provided to each early-adopter purchaser.

20 Claims, 12 Drawing Sheets

(56) References Cited

U.S. PATENT DOCUMENTS

| | | | |
|---|---|---|---|
| 5,367,148 A | 11/1994 | Storch et al. | |
| 5,426,281 A | 6/1995 | Abecassis | |
| 5,467,269 A * | 11/1995 | Flaten | 705/14.17 |
| 5,537,314 A * | 7/1996 | Kanter | 705/14.13 |
| 5,642,279 A * | 6/1997 | Bloomberg et al. | 705/14.34 |
| 5,675,662 A | 10/1997 | Deaton et al. | |
| 5,710,886 A | 1/1998 | Christensen et al. | |
| 5,729,693 A | 3/1998 | Holda-Fleck | |
| 5,809,481 A * | 9/1998 | Baron et al. | 705/14.4 |
| 5,874,896 A * | 2/1999 | Lowe et al. | 340/572.1 |
| 5,918,219 A * | 6/1999 | Isherwood | 705/37 |
| 6,064,986 A * | 5/2000 | Edelman | 705/36 R |
| 6,901,374 B1 * | 5/2005 | Himes | 705/14.37 |
| 7,013,286 B1 * | 3/2006 | Aggarwal et al. | 705/14.26 |

OTHER PUBLICATIONS

Yahata, S., *Ongoing Price Reduction and Employment Adjustment in the Japanese Distributor*, Jul. 1, 1995, 2 pp.

Logicode Technology Announces Ultimate Added-Value Line of Modems, Business Wire, Aug. 27, 1997, 2 pp,.

Eclipse: Early Adaptor—(http: www.elwoodcorp.com/early.htm) Jul. 1, 1995, 3 pp.

Privatizing Protection—Section VII—http:www.dbtrabc.com/film/subJapan/priv.sub), download date Sep. 16, 1997, 12 pp.

PCT International Search Report for Application No. PCT/US98/22922 mailed Mar. 30, 1999, 1 pg.

Notice of Allowability for U.S. Appl. No. 08/961,964 mailed Nov. 1, 1999, 7 pp.

Office. Action for U.S. Appl. No. 08/961,964 mailed Mar. 4, 1999, 8 pp.

Office Action for U.S. Appl. No. 09/441,978 mailed Mar. 20, 2003, 27 pp.

Office Action for U.S. Appl. No. 09/441,978 mailed Aug. 2, 2002, 16 pp.

Office Action for U.S. Appl. No. 09/441,978 mailed, Oct. 15, 2001, 16 pp.

Office Action for U.S. Appl. No. 09/441,978 mailed, Jun. 26, 2001, 17 pp.

* cited by examiner

|  | PRODUCT IDENTIFIER 1111 1111 | 62 |
|---|---|---|
|  | QUANTITY OF SALES 70 | REWARD IDENTIFIER 72 |
| 64 → | BETWEEN 100,000 AND 999,999 | R1 |
| 66 → | BETWEEN 1,000,000 AND 1,999,999 | R2 |
| 68 → | 2,000,000 OR MORE | R3 |

| PRODUCT IDENTIFIER 1111 1111 <u>102</u> |||
|---|---|---|
| REWARD IDENTIFIER <u>116</u> | EARLY ADOPTER IDENTIFIER <u>118</u> | REWARD <u>120</u> |
| R1 | A | $10.00 |
| R1 | B | $5.00 |
| R2 | A | FREE TICKET |
| R2 | B | $5.00 |
| R3 | A | DIFFERENCE BETWEEN PURCHASE PRICE AND CURRENT RICE |
| R3 | B | $15.00 |

FIG. 6

| ACCOUNT IDENTIFIER 150 | ACCOUNT BALANCE 152 | NAME 154 | ADDRESS 156 |
|---|---|---|---|
| 350 | $0.00 | SUSAN GREEN | 987 MAIN ST. ANYWHERE, USA |
| 351 | $0.00 | JACK RED | 65 RIVER RD. TOWN, USA |
| 352 | $10.00 | ELIOT BROWN | 4321 PARK ST. CITY, USA |
| 353 | $50.00 | BILL SMITH | 123 TOWER DR. VILLAGE, USA |

FIG. 8

| PACKAGE IDENTIFIER 308 | PRODUCT IDENTIFIERS 310 | CONDITIONS OR NUMBER NEEDED TO REGISTER 312 | INCREASED REWARD 314 |
|---|---|---|---|
| 82 | 1111 1111, 1148 2790 | 2 | EXTRA $10.00 |
| 96 | 1234 2000, 1809 5678, 9012 3254, 1744 3456 | ANY 3 | DOUBLE REWARDS |
| 101 | 7890 2652, 1810 1234, 5678 3315, 4491 9359 | ANY 2 | DISCOUNT ON ADDITIONAL PRODUCT IN PACKAGE |

FIG. 11

METHOD AND APPARATUS FOR ADMINISTERING A REWARD PROGRAM

CROSS-REFERENCE TO RELATED APPLICATIONS

The present application is a continuation of U.S. application Ser. No. 11/946,435 filed on Nov. 28, 2007, which is a continuation of U.S. patent application Ser. No. 09/441,978, which is a continuation of U.S. patent application Ser. No. 08/961,964, now U.S. Pat. No. 6,049,778, which are assigned to the assignee of the present invention and are incorporated by reference in their entirety herein.

FIELD OF THE INVENTION

The present invention relates to systems for administering reward programs.

BACKGROUND OF THE INVENTION

Many businesses experience pressures to rapidly bring newly-introduced goods and services ("new products") to market. With heightened domestic and global competition, companies that do not obtain market share quickly lose out to those companies that do. Consequently, the life cycles (period from product introduction to discontinuation) of many products are relatively brief, and many businesses strive to recover product development costs in just a few years.

It is particularly important to develop market share rapidly upon the introduction of a new product. Otherwise, the product may fail to ever gain consumer acceptance. Unfortunately, consumers are often slow to purchase new products, especially those containing new technology. It is particularly difficult, for example, to sell new computer, electronic and other "high-tech" products. This slow adoption causes some new products to suffer from a "chicken-and-egg" problem, in which low sales of a product decrease the chance that the product will ever gain consumer acceptance. Poor demand for digital video disk (DVD) players, for example, has decreased the ability and motivation of businesses to provide DVDs. The low availability of DVDs in turn discouraged consumers from buying DVD players. It has thus become difficult for either the disks or the players to overcome consumer reluctance and gain market share.

In many cases, widespread sales and acceptance of products is essential to the effective use and enjoyment of the product. Consequently, many consumers refrain from purchasing products until it has been shown that a significant number of other consumers have purchased those products. For example, early in the life cycle of facsimile ("fax") machines, there were few fax machines with which to communicate. Accordingly, their usefulness was limited, and the fax machine did not become highly useful or desirable until a significant number of consumers had likewise purchased a fax machine.

In addition to the above-described difficulties in marketing new products, such new products are often expensive, particularly in comparison to established product technologies. Many consumers are thus reluctant to purchase new products because the product price may decrease significantly with market acceptance. Such initially high prices are typically necessary for manufacturers to recover product development costs. In addition, prices typically decrease upon reaching greater production volumes, which yield economies of scale. Consequently, it is not uncommon for the price paid during the introduction of a product to be two to five times greater than the price paid thereafter. For example, a typical cellular telephone cost approximately $10,000 when first introduced in the early 1980's. After fifteen years, the cost of a typical cellular telephone has decreased to approximately $100 to $200. Many consumers thus prefer to wait for product prices to decrease, and consequently new products often suffer from poor sales. In sum, businesses are often driven by opposing pressures: the need to sell at low prices to stimulate new product sales, and the need to sell at high prices to recover product development costs in a short amount of time.

To stimulate sales, particularly sales of new products, many businesses offer various promotions as an incentive to purchase the products. For example, a business may offer the product at a substantial discount, or the product may be accompanied by a gift. Unfortunately, such promotions incur costs, even if they are unsuccessful in increasing sales. Accordingly, businesses are often reluctant to invest significant resources in high-value promotions, since such investment may incur costs but yield little or no benefit.

One system for attempting to quickly grow market share of products is known in the art as a multi-level marketing ("MLM") scheme. In MLM, a salesperson establishes himself at a higher level in a "pyramid" than salespeople to whom he sells. Typically, a salesperson acquires salespeople below him by "recruiting" or otherwise convincing others to sell the product. The salesperson is paid commissions for sales that are consummated by lower-level salespeople. Sales people at the highest levels are paid the highest commissions, since they have many levels below them generating sales and hence commissions. Salespeople at the lowest levels are paid the lowest commissions, if any. Due to the tiered commission structure, MLM schemes have the inherent disadvantage of inflating product costs. Furthermore, multi-level marketing requires each person in the pyramid to be a salesperson, which is annoying to many people and thus discourages most people from participating in MLM schemes. In other words, each person in an MLM pyramid cannot be passive, but must invest a significant amount of time and energy in being an active salesperson. Accordingly, typical purchasers are neither willing nor capable of participating in MLM schemes.

It would be advantageous to provide a method and apparatus that facilitates the introduction and sale of new products. Such a method and apparatus would ideally overcome the drawbacks of known systems for promoting the sale of new products.

SUMMARY OF THE INVENTION

It is an object of the present invention to provide a method and apparatus for administering a reward program.

In accordance with the present invention, a central controller stores a series of registrations, each of which corresponds to a purchaser of a product. The central controller calculates a measurement of product success, such as the number of products sold. The central controller evaluates product success by determining whether the measurement is within a predetermined range. For example, the central controller may determine whether the number of products sold exceeds a predetermined threshold, or whether the price of the product has decreased to a predetermined amount.

Upon attaining a predetermined level of product success, a selected set of "early-adopter" purchasers (purchasers who buy a product early in the product's life cycle) are rewarded. Thus, consumers are provided with an incentive to (i) buy a product earlier than they otherwise might have; or (ii) buy a product they might not have otherwise bought. A set of registrations which are early-adopter registrations are selected, thereby defining a set of early-adopter purchasers. In selecting early-adopter registrations, the central controller may select a set of registrations having ordinal positions within a predetermined range of positions, such as the first hundred registrations. Alternatively, the central controller may select a set of registrations having dates before a predetermined date, such as all registrations for products purchased within the first month of a product's introduction.

If the measurement of product success is within the predetermined range, a reward is provided to each early-adopter purchaser. A number of different types of rewards may be provided, such as a refund or a free product. For example, each early-adopter purchaser may be refunded his purchase price if sales of the product exceed 1,000,000 units, or each early-adopter purchaser could receive a $20 dividend with every 1,000,000 units sold.

BRIEF DESCRIPTION OF THE DRAWINGS

FIG. 4 is a schematic illustration of a record of a product success database of the central controller of FIG. 2.

FIG. 6 is a schematic illustration of a record of a reward database of the central controller of FIG. 2.

FIG. 8 is a schematic illustration of an account database of the central controller of FIG. 2.

FIG. 11 is a schematic illustration of a package database of the central controller of FIG. 2.

DETAILED DESCRIPTION OF THE PREFERRED EMBODIMENTS

Figure 1:
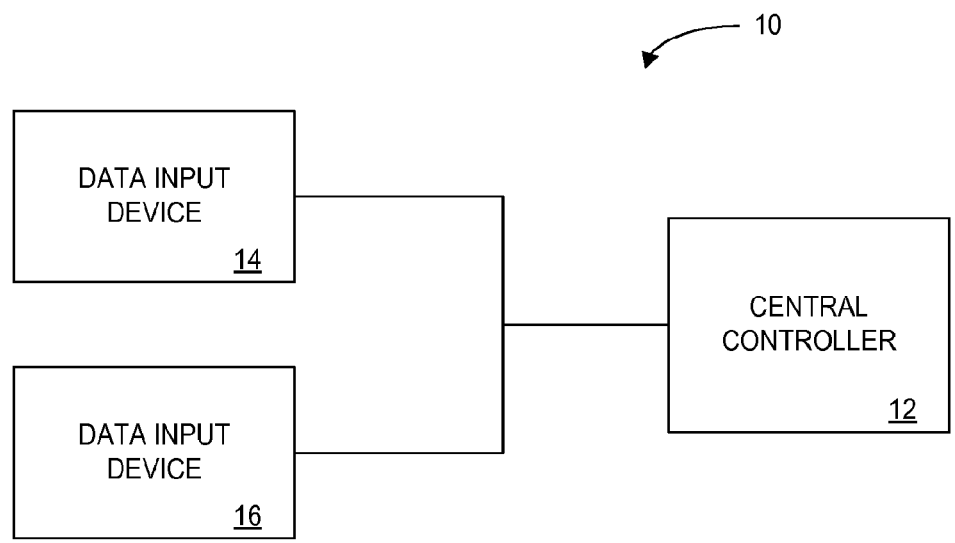
FIG. 1 is a schematic illustration of an apparatus for administering a reward program in accordance with the present invention.

The present invention allows a manufacturer, distributor or other seller to reward purchasers (e.g., individuals, families, or companies) of a product if and when the product attains a predetermined measure of "success". In particular, early-adopter purchasers (purchasers who buy a product early in the product's life cycle) are rewarded, thereby providing consumers with an incentive to (i) buy a product earlier than they otherwise might have; or (ii) buy a product they might not have otherwise bought. Accordingly, the present invention can enable sellers to sell products earlier, and even increase sales of products.

In accordance with the present invention, early-adopter purchasers are rewarded only after the product has attained a predetermined measure of "success." The reward reduces or eliminates consumer reluctance to purchase the product, since any perceived risk is mitigated by the reward. By contrast, conventional product promotions, which offer rewards regardless of product success, incur the costs of the rewards even if the product is not successful. Accordingly, the present invention is particularly beneficial in the sale of new products, such as new electronic devices, car models, software, magazine subscriptions, airline routes, books, video tapes, lottery games, telephone plans, leasing systems, prescription drugs and products sold by new stores or companies.

The methods and apparatus of the present invention can permit a seller to recover the investment costs of new products earlier in the product life cycle. In addition, the seller may make profits more quickly than if early-adopter purchasers were not identified and rewarded. Profits accruing from a product as well as market share should increase as total sales of the product increase, thereby funding the rewards provided to early-adopter purchasers.

Similarly, purchasers may be able to recover the typically large cost of purchasing a new product by receiving rewards for early purchases of the product. Certain purchasers may even recover more than the purchase price of the product. Such rewards provide the purchasers with incentives to buy the product early in the life cycle of the product. Furthermore, purchasers that view the purchased product favorably have even more incentive to tell others, and thereby promote the product. Early-adopter purchasers thus may function as both salespeople and investors in the company selling the product, yet those purchasers need not actually exert the effort in selling the product themselves, such as participants in MLM.

The description that follows is arranged into the following sections: Registering Products, Measuring Product Success, Rewarding Early-Adopter Purchasers and Exemplary Embodiments.

Registering Products

Purchasers of a product may be identified by corresponding registrations for the product. A registration is an entry which specifies registration information, such as one or more of (i) the product purchased; (ii) a serial number or other unit identifier for specifying the particular unit of the product which was purchased; (iii) the name of the purchaser; (iv) the address of the purchaser; (v) the location where the product was purchased; (vi) the price paid for the product; and (vii) the date of purchase.

Referring to FIG. 1, an apparatus 10 for administering a reward program includes a central controller 12 in communication with data input devices 14 and 16. Each of the data input devices 14 and 16 collects registration information directly or indirectly from purchasers (not shown), and transmits the registration information to the central controller 12. The registration information transmitted to the central controller 12 may be encrypted for security. The central controller 12 in turn generates and stores corresponding registrations based on the registration information. The purchasers thereby become "registered purchasers" of the product. The central controller 12 may be operated by several types of entities, such as a product manufacturer, a credit issuer, a credit card clearinghouse or a third party that administers reward programs for various manufacturers.

The data input devices 14 and 16 are computers, network terminals or other devices for transmitting the registration information to the central controller. Although two data input devices are shown in FIG. 1, any number of data input devices may be in communication with the central controller 12. Registration information may be collected via data input devices 14 and 16 in a number of ways. For example, many products are accompanied by a registration card, upon which the purchaser prints the required registration information. The registration card is then submitted, and may also be accompanied by a receipt or other proof of purchase of the product. Typically, a data entry operator receives and reads the submitted card, and types the registration information into one of the data input devices 14 and 16, which may be a computer connected to the central controller 12 via a communication network. In another embodiment, the purchaser may speak with an operator using a telephone, and the operator types the registration information into one of the data input devices 14 and 16. Alternatively, one of the data input devices 14 and 16 is a telephone connected to a voice-response unit (VRU). A purchaser may enter appropriate registration information via the VRU by pressing telephone buttons in response to VRU prompts.

In summary, there exist many ways in which registration information may be submitted to the central controller 12. Registration information may be collected at the time of purchase, and subsequently submitted from the point of purchase. For example, a purchaser may buy a television at an appliance store. An appliance store employee collects registration information from the purchaser, and in turn enters the registration information via one of the data input devices 14 and 16, which may be a computer in the appliance store. The computer transmits the registration information to the central controller 12. Alternatively, the purchaser may enter registration information via one of the data input devices 14 and 16, which may be a kiosk located in the store. The kiosk in turn transmits the registration information to the central controller 12. In such embodiments, a store identifier specifying the location of the purchase may also be included as registration information that is transmitted to the central controller 12.

In another embodiment, one of the data input devices 14 and 16 is a point-of-sale ("POS") terminal, such as a cash register with a credit card reader. After recording a purchase, the card reader transmits a purchase price, product code and credit card account number to the central controller 12, which is operated by the credit card issuer or a credit card clearinghouse.

In still another embodiment, at least one of the data input devices 14 and 16 is a personal computer on a communication network, such as the Internet. The personal computer (i) initiates an order from a purchaser, (ii) collects registration information along with the order, and (iii) submits the order and registration information to the central controller 12. Ideally, the purchaser would not have to submit additional information with the order, but instead the registration information would be completely available from or determined by the order. For example, an order may include registration information, such as the product, the purchaser's name and delivery address. Additional registration information, such as a serial number of the unit bought, the price paid for the unit, and the date of purchase, could be automatically determined by the central controller 12, even though it may not be explicitly specified in the order submitted by the purchaser. For example, the serial number of the unit bought and price paid could be determined by the central controller 12 from inventory information, and the date of purchase could be determined with reference to a timer signal. Many other methods for collecting and organizing registration information will be apparent to those skilled in the art.

Figure 2:
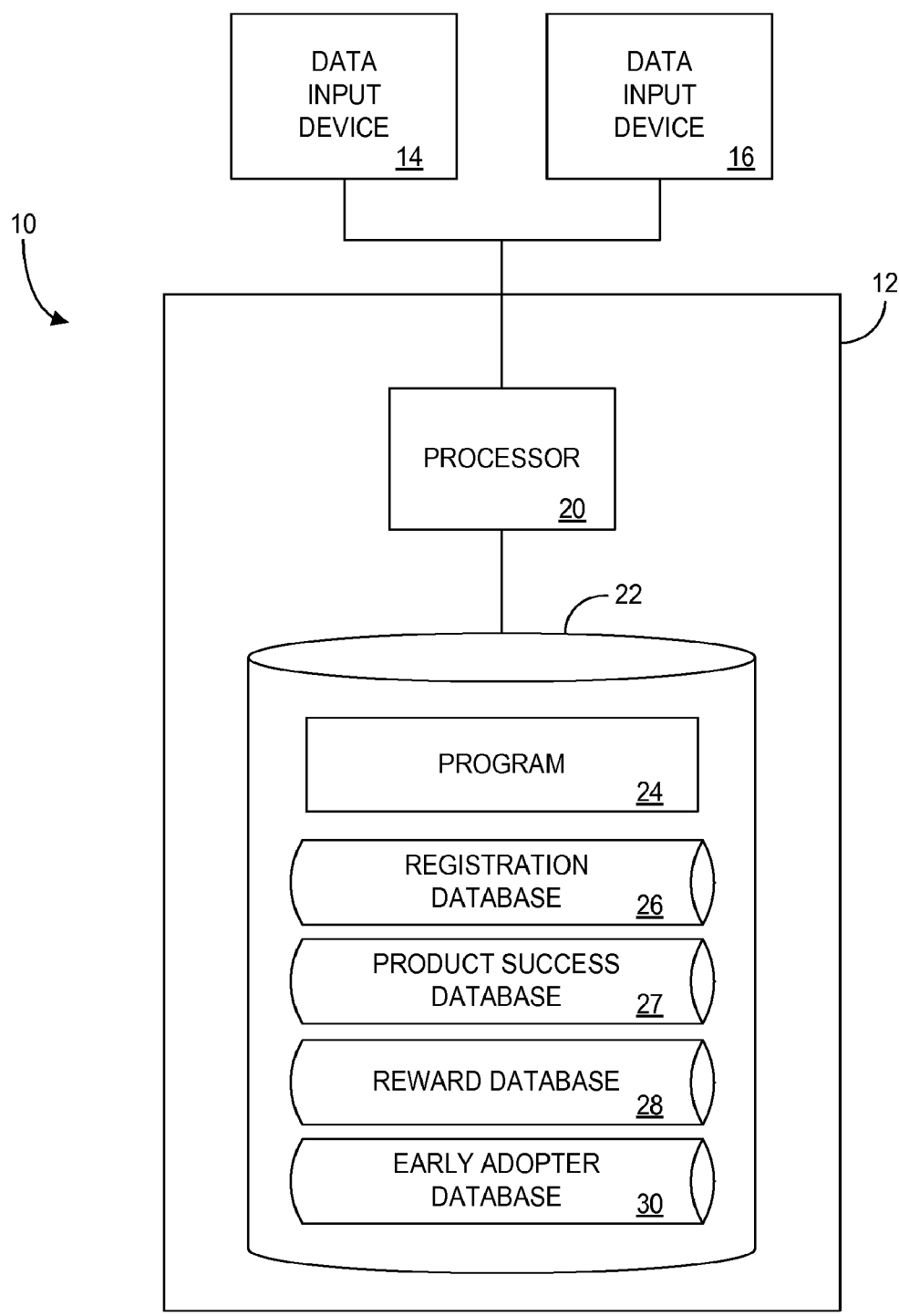
FIG. 2 is a schematic illustration of a central controller of the apparatus of FIG. 1.

Referring to FIG. 2, the central controller 12 comprises a processor 20, such as one or more conventional microprocessors, which is connected to a data storage device 22, such as a RAM, floppy disk, hard disk or combination thereof. The processor 20 is in communication with each of the data input devices 14 and 16. The processor 20 and the storage device 22 may each be (i) located entirely within a single computer or other computing device; (ii) connected to each other by a remote communication link, such as a serial port cable, telephone line or radio frequency transceiver; or (iii) a combination thereof. For example, the central controller 12 may comprise one or more computers which are connected to a remote server computer for maintaining databases.

The storage device 22 stores (i) a program 24 for controlling the processor 20; (ii) a registration database 26; (iii) a product success database 27; (iv) a reward database 28; and (v) an early adopter database 30. The program 24 drives the processor 20 to operate in accordance with the present invention, and particularly in accordance with the methods described in detail herein. The program 24 also includes program elements that may be necessary, such as "device drivers" for interfacing with computer peripheral devices. Appropriate device drivers and other necessary program elements are known to those skilled in the art, and need not be described in detail herein. Each of the databases 26, 27, 28 and 30 is described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides the tables shown. Similarly, the illustrated entries represent exemplary information, but those skilled in the art will understand that the number and content of the entries can be different from those illustrated herein.

Figure 3:
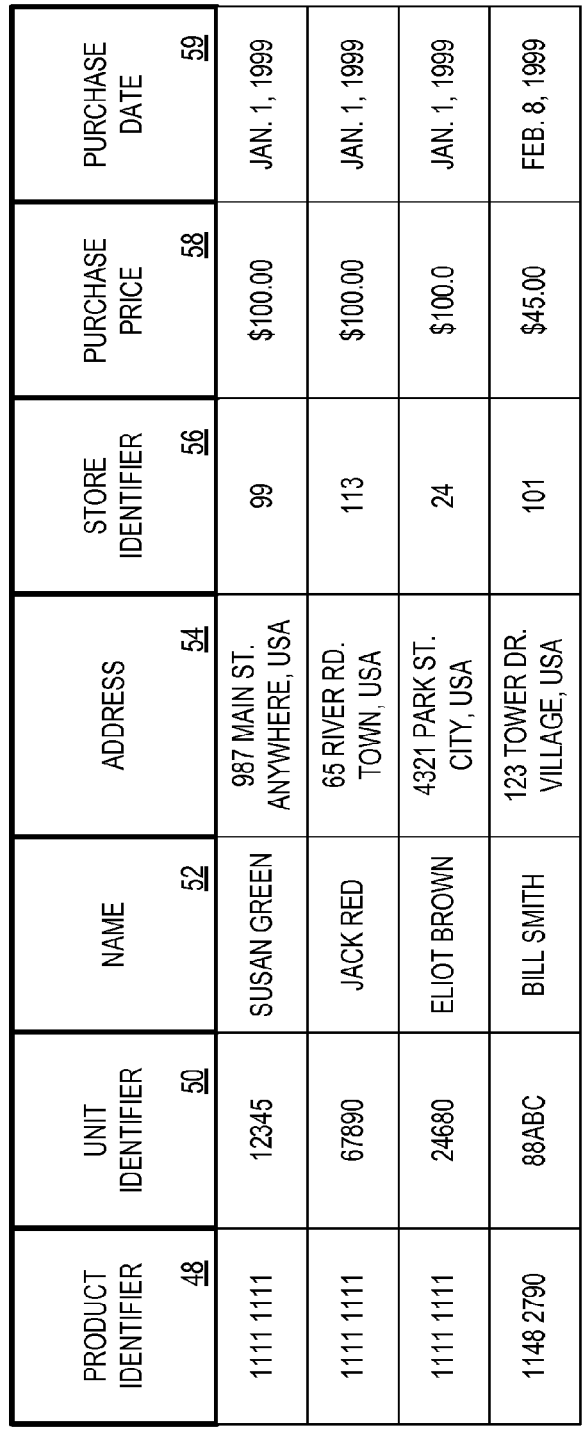
FIG. 3 is a schematic illustration of a registration database of the central controller of FIG. 2.

Referring to FIG. 3, the registration database 26 stores entries 40, 42, 44 and 46 which each define a registration. Each of the entries 40, 42, 44 and 46 includes registration information, such as (i) a product identifier 48 for specifying the product that was purchased; (ii) a unit identifier 50 for specifying a particular unit of the product that was purchased; (iii) a name 52 of a purchaser; (iv) an address 54 of the purchaser; (v) a store identifier 56 for specifying a store, if any, where the product was purchased; (vi) a purchase price 58 of the product; and (vii) a purchase date 59 of the product.

As described above, registration information typically includes a unit identifier. The unit identifier specifies the particular unit of the product that was purchased, and thus may be a unique unit code, such as a serial number. Alternatively, the unit identifier may be a unique transaction code generated upon each sale of the product, and printed on a receipt upon completion of the sale.

Unit identifiers should ideally be chosen to prevent fraud. Unscrupulous individuals may attempt to become registered purchasers without having purchased the product. For example, an individual may create copies of registration cards and submit those cards in an attempt to gain the benefit of several registrations. If a number of submitted cards include the same unit identifier, the fraud is easily detected since each unit identifier must be unique. However, if each submitted card contains different but valid unit identifiers, fraud may be more difficult to detect. Accordingly, if valid unit identifiers may be easily ascertained from other unit identifiers, unscrupulous individuals may attempt to submit registration information containing those valid identifiers, though they have not purchased the units corresponding to those identifiers. For example, if all numbers in a range from 10,000 to 11,000 are valid unit identifiers, then a purchased unit having a unit identifier "10,000" permits an individual to guess that the unit identifier "10,001" is valid as well. Such an individual could possibly submit two registration cards, even if he has not purchased two units of the product.

It is thus desirable that valid unit identifiers are not, for example, sequential numbers. Instead, unit identifiers may be randomly generated numbers or alphanumeric characters. In addition, unit identifiers may be combinations of two or more identifiers. For example, unit identifiers may be combinations of (i) serial numbers; (ii) credit card numbers; (iii) unique transaction codes; and/or (iv) store identifiers specifying a location of a purchase. Such combinations make it more difficult to fraudulently become a registered purchaser. Further, unit identifiers may be encrypted such that information (e.g., serial number or store identifier) may be determined therefrom, but such information could not be easily modified without resulting in an invalid unit identifier. Such encryption also impedes attempts to ascertain valid unit identifiers from other unit identifiers. Many encryption techniques are well known, and described in "Applied Cryptography, Protocols, Algorithms, and Source Code in C", by Bruce Schneier.

Unscrupulous individuals may attempt to remain registered purchasers even after returning a purchased product. However, if each unit is uniquely identified and a corresponding registration may be determined from a returned unit, the central controller 12 (FIG. 1) can delete the associated registration after the unit is returned. For example, if the returned unit has a serial number, a registration that includes the serial number may be identified and deleted. Alternatively, each unit of the product may have a "scratch-off" coating or label that reveals a unit identifier when scratched. Each unit is thus uniquely identified by the label's unit identifier. When a unit of a product is being returned, the label is examined to determine if the unit identifier is revealed. If the unit identifier were unrevealed, it would be known that there exists no corresponding registration for the unit. In another embodiment, unique transaction codes may be printed on receipts. Each transaction code may thereby serve as the unit identifier, and may be compared with registrations when a product is returned with the receipt.

In known systems for registering products, not all purchasers submit their corresponding registration information. However, since in the present invention early-adopter purchasers are identified and rewarded only after submitting registration information, the present invention would typically increase the number of purchasers that submit such registration information. Registration information is particularly valuable, and can permit companies to track sales and to target promotions and advertising more effectively.

Measuring Product Success

The central controller 12 (FIG. 1), which stores registrations, calculates a measurement of product success, and provides a reward to each early-adopter purchaser if the measurement is within a predetermined range. Typically, the measurement of product success is the quantity of sales, and a reward is provided if the number of sales exceeds a predetermined number. However, in other embodiments the measurement of product success may be, for example, product market share, product price, product revenue or product profit. For example, the measurement of product success may be the product price, and a reward is provided if the product price has fallen below a predetermined price. Further, the measurement of product success may be calculated in absolute terms (e.g., profit made during the fiscal year) or relatively (e.g., 10,000 more units sold than a competitor sold).

Referring to FIG. 4, a record 60 of the product success database 27 (FIG. 2) defines product success parameters for a product identified by a product identifier 62. The product success database 27 (FIG. 2) typically includes a plurality of records such as the record 60, each defining product success parameters for a different product. The record 60 includes entries 64, 66 and 68 which each specify (i) a quantity of sales 70; and (ii) a reward identifier 72 indicating a reward schedule, described in detail below. Each of the entries 64, 66 and 68 thereby specifies rewards to be provided upon attaining the corresponding quantity of sales. It will be understood by those skilled in the art that any number of entries may be used.

It may be desirable to divide product success into "tiers", in which each tier corresponds to different ranges of the measurement of product success. For example, 100,000 sales may indicate the lower threshold of a first tier of product success, 1,000,000 sales may indicate the lower threshold of a second tier of product success, and 2,000,000 or more sales may indicate a third tier of product success. Accordingly, each predetermined range corresponds to a tier, and thus each tier corresponds to an entry of the record 60. If the measurement of product success falls within one of the predetermined ranges (the quantity of sales 70), a reward (specified by the reward identifier 72) is provided to each early-adopter purchaser. As described below, the reward provided for each tier may be the same (e.g., ten dollars for every 100,000 sales) or may be different (e.g., ten dollars upon reaching 100,000 sales, and fifty dollars upon reaching 1,000,000 sales).

Rewarding Early-Adopter Purchasers

Generally, an early-adopter purchaser is a purchaser who buys a product early in the life cycle of the product. Whether a purchaser is considered an early-adopter purchaser may be determined from the corresponding registration of that purchaser. A set of registrations which are early-adopter registrations are selected, thereby defining a set of early-adopter purchasers.

In one embodiment, the registrations are arranged in a series, and each registration of the series has an ordinal position. Thus, each registration defines a number of prior registrations and a number of successive registrations. The ordinal position of each registration indicates the order in which corresponding registration information was received, or alternatively the order in which the corresponding product was purchased. For example, the registration information of the first received registration card is used in generating the first registration in a series of registrations. Early-adopter registrations may be defined as a set of registrations having ordinal positions within a predetermined range of positions. For example, all registrations from the first registration to the one-thousandth registration may be considered early-adopter registrations.

In another embodiment, each registration has a corresponding date indicating the date on which corresponding registration information was received, or the purchase date on which the product was purchased. Early-adopter registrations may be defined as a set of registrations having dates before a predetermined date. For example, all registrations having dates before Jan. 4, 1999 may be considered early-adopter registrations. Alternatively, early-adopter registrations may be defined as a set of registrations having dates within a predetermined range of dates, such as all registrations having dates between Jan. 1, 1999 and Jan. 31, 1999. It may be advantageous to have a range of dates that starts after the introduction of a product, instead of at the introduction of the product. For example, a manufacturer may desire to wait for the product production to reach a certain level.

In still other embodiments, the set of early-adopter registrations may be defined as a random selection of registrations, or alternatively a random selection of registrations that meet certain criteria. For example, of all registrations having dates before Jan. 4, 1999, half are randomly selected to be considered early-adopter registrations. As another example, of all registrations from the first registration to the one-thousandth registration, one hundred are randomly selected to be considered early-adopter registrations.

Figure 5:
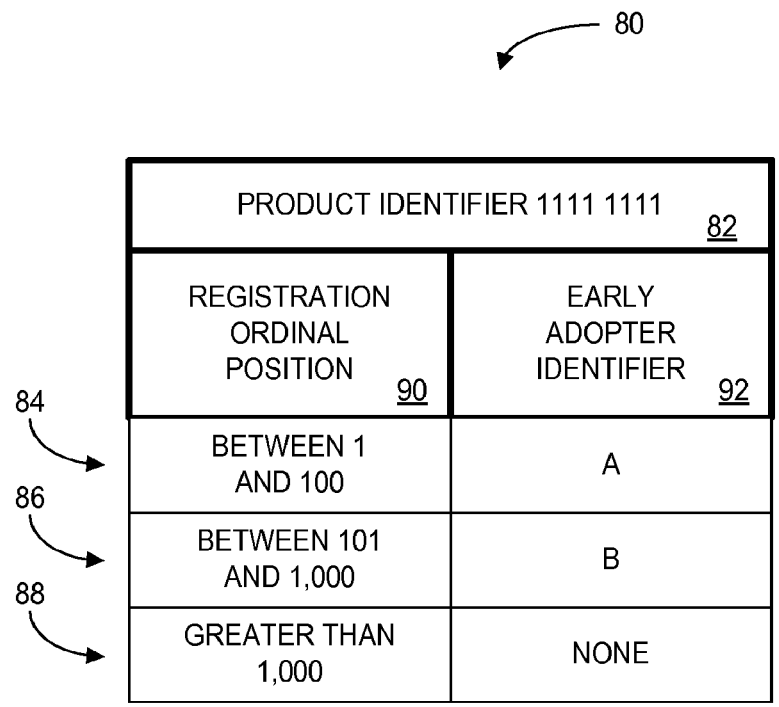
FIG. 5 is a schematic illustration of a record of an early adopter database of the central controller of FIG. 2.

Referring to FIG. 5, a record 80 of the early adopter database 30 (FIG. 2) defines criteria for determining whether a registration is an early-adopter registration, and consequently, whether a purchaser is an early-adopter purchaser. The record 80 is for a product identified by a product identifier 82. The early adopter database 30 (FIG. 2) typically includes a plurality of records such as the record 80, each defining criteria for determining whether a registration for a product is an early-adopter registration. The record 80 includes entries 84, 86 and 88 which each specify (i) a registration ordinal position 90; and (ii) an early adopter identifier 92. Each of the entries 84, 86 and 88 includes criteria to determine whether a registration is an early-adopter registration, based on the ordinal position of the registration. It will be understood by those skilled in the art that various other criteria may be used instead of the ordinal positions of registrations. For example, as described above, the date of the purchase may be used to determine whether a registration is an early-adopter registration.

Further, early-adopter registrations may be divided into groups. For example, if the first one thousand registrations received are defined to be early-adopter registrations, a first group may be defined as the first one hundred registrations received, and a second group may be the nine hundred subsequently-received registrations. The entry 84 defines a first group (the first 100 registrations) having an early adopter identifier "A", while the entry 86 defines a second group (the next 900 registrations) having an early adopter identifier "B". The entry 88 specifies no early adopter identifier, and therefore indicates that registrations having ordinal positions greater than 1000 are not considered early adopter registrations. It will be understood by those skilled in the art that any number of entries may be used, and thus, that any number of groups of early-adopter registrations may be established. Further, there may be one or more records, and thus one or more products, for which every registration is defined to be an early-adopter registration. Thus, there may be one or more products for which every purchaser is provided with a reward.

Early-adopter registrations may also be divided into groups based on other criteria, such as the geographic areas of the corresponding purchasers. For example, each group may correspond to early-adopter purchasers in a state or metropolitan area.

The separation of early adopter registrations into groups is especially advantageous in providing a different reward to each group of early-adopter purchasers. For example, the first one hundred purchasers of a product may receive a larger reward than the next nine hundred purchasers. Determining and providing rewards are described in detail below.

It may also be desirable to inform purchasers whether they are early-adopter purchasers. A purchaser may be thus informed after his corresponding registration is generated. For example, if the purchaser submits an order for a product via the Internet, he may receive a message "You are registration number 963" and/or "You are an early-adopter, and will receive a reward after 1,000,000 units are sold". It may also be desirable to inform a purchaser as to the total number of sales. For example, at periodic intervals, registered purchasers may receive an electronic-mail message, such as the message "As of today, there are 12,073 sales." If early-adopter registrations are divided into groups, the purchaser may be informed of the group to which he belongs. For example, he may receive a message "You are one of the first 100 purchasers".

Referring to FIG. 6, a record 100 of the reward database 28 (FIG. 2) defines rewards to provide early-adopter purchasers, based on product success. The record 100 corresponds to a product identified by a product identifier 102. The reward database 28 (FIG. 2) typically includes a plurality of records such as the record 100, each defining rewards to provide early-adopter purchasers of a different product. The record 100 includes entries 104, 106, 108, 110, 112 and 114 which each specify (i) a reward identifier 116 corresponding to the reward identifier 72 (FIG. 4) of the product success database 27 (FIG. 2); (ii) an early adopter identifier 118 corresponding to the early adopter identifier 92 (FIG. 5) of the early adopter database 30 (FIG. 2); and (iii) a reward 120. Each of the entries 104, 106, 108, 110, 112 and 114 defines a reward to provide to a particular group of early-adopter purchasers for a particular reward schedule defined by the reward identifier. For example, the entries 104 and 106 indicate that the reward identifier "R1" defines that $10 is to be provided to early-adopter purchasers of group "A" and $5 is to be provided to early-adopter purchasers of group "B".

Figure 7:
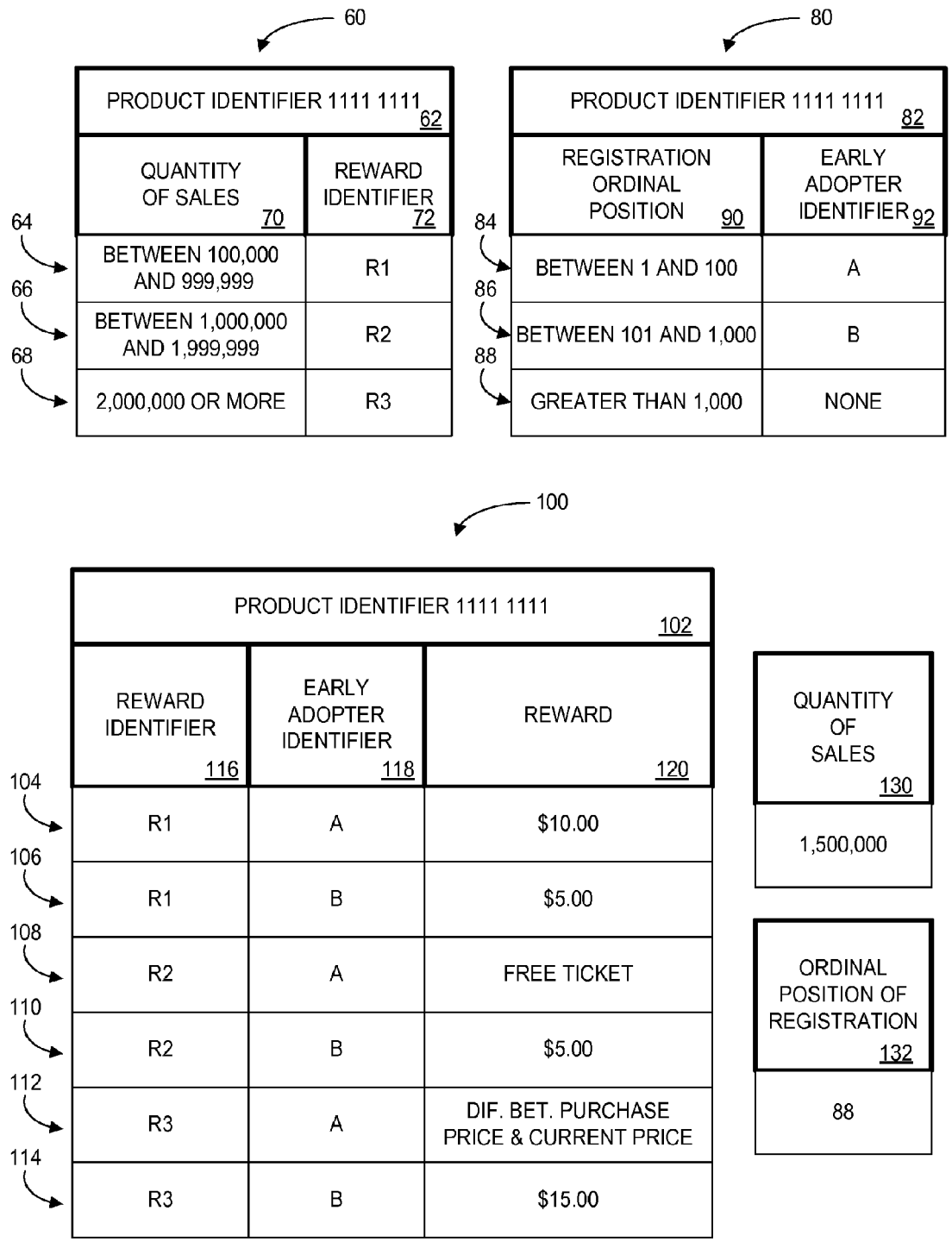
FIG. 7 is a schematic illustration of exemplary records of the records of FIGS. 4, 5 and 6.

Referring to FIG. 7, an exemplary quantity of sales 130 determines a reward provided to an early-adopter purchaser of the product identified by product identifier "1111". As shown in FIG. 7, the exemplary quantity of sales is 1,500,000 sales. Thus, according to the entry 66 of the record 60, the reward schedule specified by the reward identifier "R2" is to be effective.

The ordinal position 132 of an exemplary registration (not shown) under consideration is shown to be "88". Thus, according to the entry 84 of the record 80, the purchaser corresponding to the exemplary registration is an early-adopter purchaser, and corresponds to a group "A" of early-adopter purchasers. Turning to the entry 108 of the record 100, the reward identifier "R2" and the early adopter identifier "A" together indicate that the purchaser corresponding to the exemplary registration is provided a free ticket, such as a ticket to a sporting event.

A number of different types of rewards are within the scope and spirit of the present invention. For example, rewards may be money, such as a fixed amount or a discount on another product, and may further be an amount of money based on the purchase price. Such an amount may be a refund of the purchase price or a portion thereof, or an amount of money based on the difference between the corresponding purchase price and a current product price. The reward may be an additional unit of the product, another product altogether, or a gift certificate for a product. The reward may also be an access code for permitting access to a network. For example, a code provided to early-adopter purchasers may permit access to a site on the World Wide Web where free software may be obtained. In addition, the reward may be an increased prize on a winning lottery entry, or an increased chance of winning with a lottery entry. The reward may also be a warranty for a product or an extension thereof.

In addition, the reward to a purchaser may comprise the establishment and/or adjusting of an account balance. Each reward provided to the purchaser increases the account balance. The account balance may be redeemed ("cashed out") for funds or products having a corresponding value.

Referring to FIG. 8, an account database 140 stores entries 142, 144, 146 and 148 which each define an account for a registered purchaser. The account database 140 is typically stored in the storage device 22 (FIG. 2) of the central controller (FIG. 2). Each of the entries 142, 144, 146 and 148 specifies (i) an account identifier 150 for uniquely specifying each account; (ii) an account balance 152; (iii) a name 154 of the purchaser; and (iv) an address 156 of the purchaser.

Many methods of increasing the account balances may be used. In one embodiment, each successive amount added to the balance increases upon reaching each successive tier of product success. Thus, successive rewards increase the balance by successively larger amounts. For example, an opening account balance may increase from $0 to $10, then to $25 and then to $50 upon reaching three respective tiers of product success. Thus, it is more valuable for the purchaser to wait before cashing out the account. Accordingly, the manufacturer, credit card account issuer or other party which pays purchasers when accounts are cashed out benefits by not paying until relatively high product success is achieved.

The purchaser may determine when his corresponding account balance is cashed out, and initiate such cashing out, for example, via an Internet site or a voice response unit (VRU) over a telephone. In addition, the central controller may determine when purchasers are cashed out, and typically makes such determinations based on predetermined criteria. For example, if each tier of product success doubles the account balance of each early-adopter purchaser, the central controller may cash out account balances before the balances grow too large.

When account balances are cashed out, the purchasers may be provided with the corresponding payments using one or more methods by which rewards may be provided. For example, rewards may be (i) credited to a credit card account or other financial account; (ii) mailed to early-adopter purchasers, typically in the form of a check or product; or (iii) sent to stores or other predetermined locations until picked up by the early-adopter purchasers, who are notified thereof.

Figure 9:
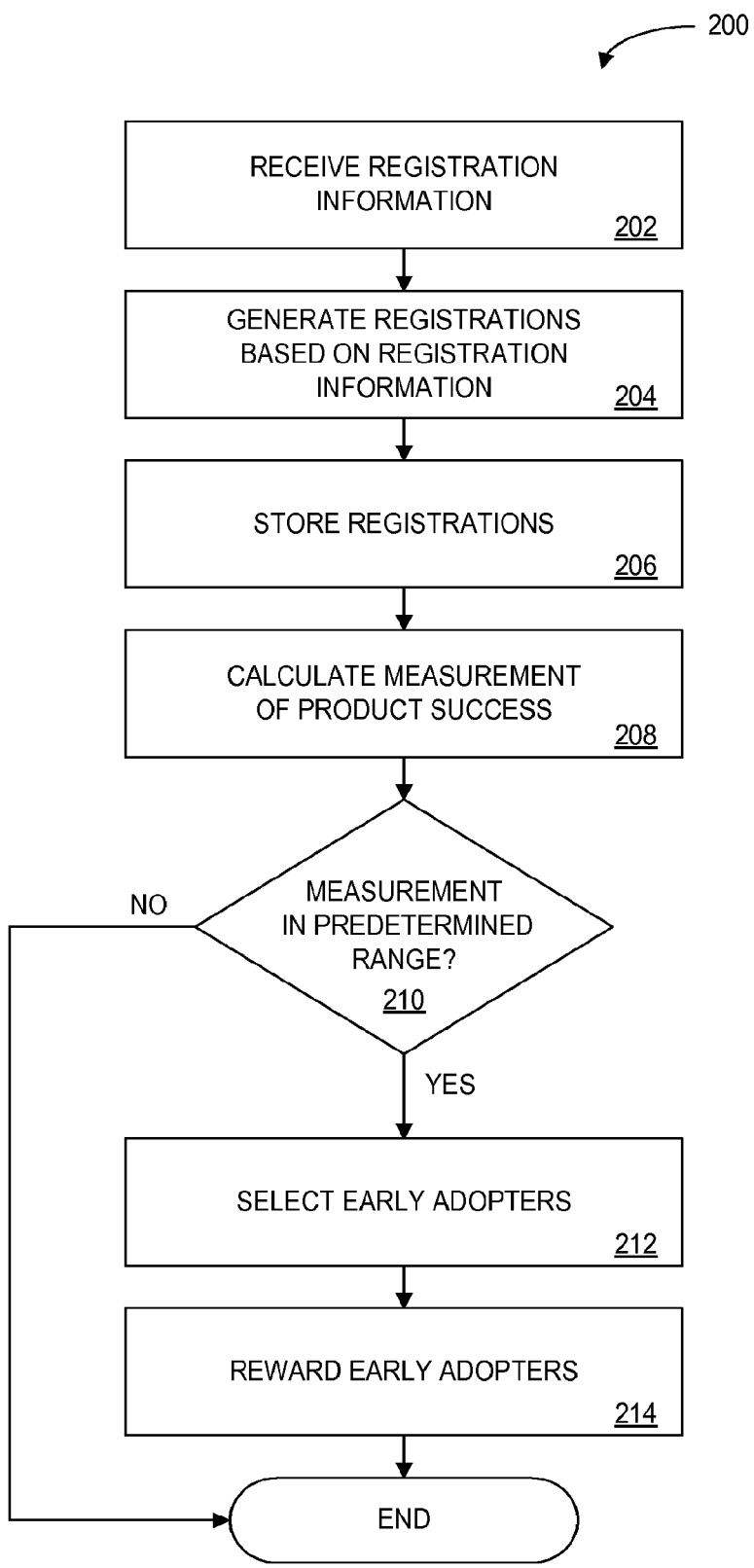
FIG. 9 is a flowchart illustrating a method for administering a reward program.

Referring now to FIG. 9, a method 200 for administering a reward program is performed by the central controller 12 (FIG. 1). The central controller 12 receives registration information (step 202) and generates in dependence thereon corresponding registrations (step 204). Each registration is stored (step 206). The central controller calculates a measurement of product success (step 208), typically at periodic intervals. If the measurement of product success is within a predetermined range (step 210), then early adopters are selected (step 212) and provided with rewards (step 214). It will be understood by those skilled in the art that the above-described method illustrates one, but not necessarily the only, sequence of steps. For example, in some embodiments the step 212 of selecting early adopters may be performed as registrations are generated.

Figure 10A:
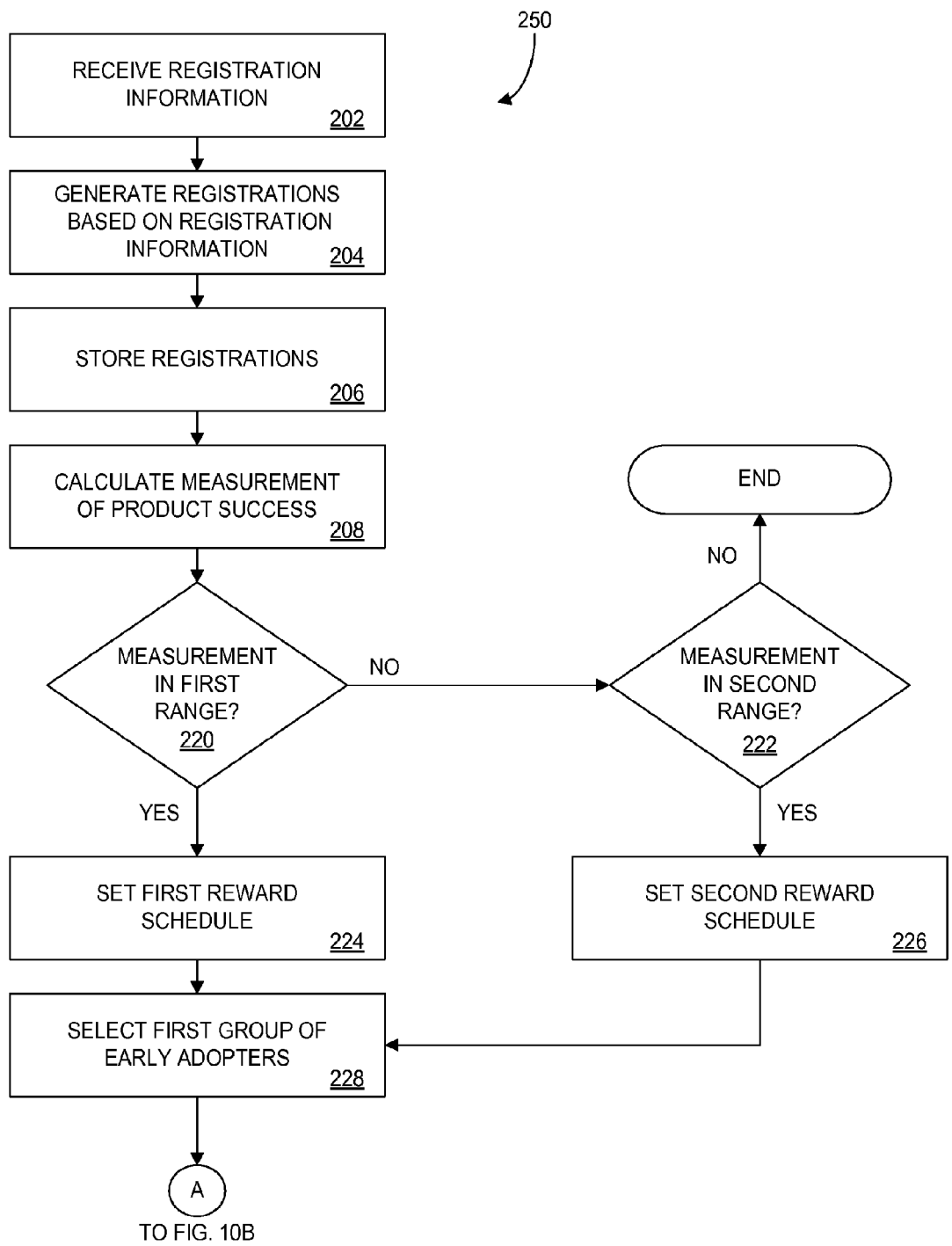
FIGS. 10A and 10B are a flowchart illustrating another embodiment of the method of FIG. 9.
Figure 10B:
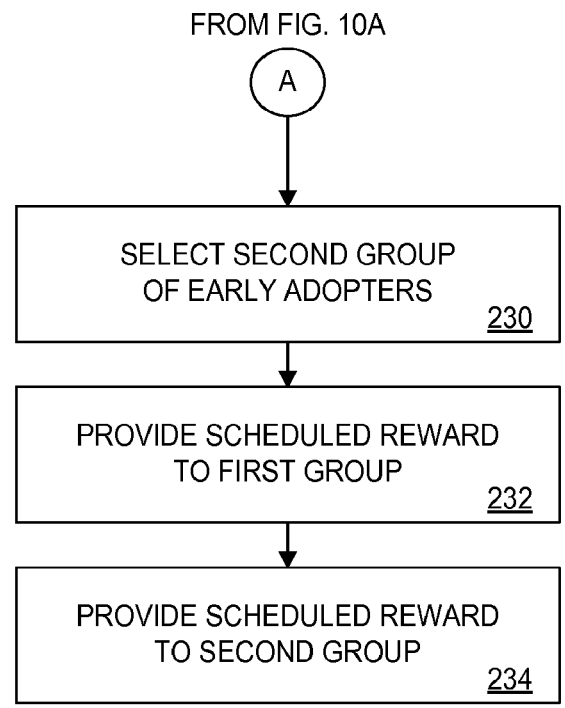

FIGS. 10A and 10B illustrates a method 250 that is another embodiment of the method 200 of FIG. 9 and like steps are indicated by like figure numerals. The method 250 further includes steps for providing rewards to groups of early-adopter purchasers upon attaining a number of tiers of product success. The central controller 12 (FIG. 1) determines if the measurement of product success is within a first range (step 220) or within a second range (step 222). If the measurement is within the first range, then a first reward schedule is set (step 224). If the measurement is within the second range, then a second reward schedule is set (step 226). Such ranges and corresponding reward schedules are determined from the entries of the product success database 27 (FIG. 2). The central controller 12 (FIG. 1) selects a first group and a second group of early-adopter purchasers (steps 228 and 230 respectively). Each of the first and second groups of early-adopter purchasers are in turn provided with a reward in accordance with the set reward schedule (steps 232 and 234 respectively).

In the embodiments of the present invention described above, rewards are provided to selected purchasers of a product. In further embodiments, the reward, if any, depends on whether the purchaser has become a registered purchaser of two or more products (a "package" of products). For example, there may be two products that are deemed "related", such as a television and a videocassette recorder (VCR). A consumer who becomes a registered purchaser of both products may be provided with an increased reward when one or both products attain a predetermined level of product success. For example, registered purchasers of the television may receive a reward of $10, and registered purchasers of the VCR may receive a reward of $10 upon respective product success, but registered purchasers of both the television and the VCR may receive a reward of $30. Thus, a customer is provided with an additional incentive ($10 more than the sum of the two individual rewards) to become registered purchasers of both related products instead of one. Similarly, a consumer who purchases a predetermined number of units of a product may become an early-adopter purchaser of that product. For example, becoming a registered purchaser of multiple units of a VCR may entitle a purchaser to an increased reward when the VCR attains a predetermined level of product success.

Such an embodiment is particularly useful in promoting products of a like nature, such as a set of electronic devices or a set of software products. It is also highly beneficial to consumers that purchase many products from a package. For example, one package might comprise ten different software products, and purchasers are provided with increased rewards if they become registered purchasers of three or more products in the package. Such increased rewards might be (i) an additional amount of money; (ii) doubling the reward provided in association with each purchased product, or (iii) providing a discount on any other product in the package.

In further embodiments, a purchaser may only become an early-adopter purchaser if he has become a registered purchaser for two or more products in a package. For example, if a purchaser buys a television, he may not be considered an early adopter until he has also bought and registered a VCR, at which point he is an early-adopter purchaser of both the television and VCR. In other words, in the instant embodiment there must be two or more registrations for products from a package in order for either registration to be considered early-adopter registrations. Thus, purchasers are provided with an incentive to buy more than a single product, and purchasers thereby become eligible to receive rewards as early-adopter purchasers.

Referring to FIG. 11, a package database 300 stores entries 302, 304 and 306, each defining a package of products. The package database 300 is typically stored in the storage device 22 (FIG. 2) of the central controller (FIG. 2). Each of the entries 302, 304 and 306 specifies (i) a package identifier 308 for uniquely identifying each package; (ii) product identifiers 310 which specify products included in the package; (iii) one or more package conditions 312, such as the number of products in the package which a purchaser must register in order to be eligible for the increased reward; and (iv) an increased reward 314. For example, the entry 304 illustrates that if a purchaser becomes a registered purchaser for any three of the products identified by "2000", "1809", "3254" and "1744", then the rewards he receives upon product success are doubled.

Exemplary Embodiments

The following are several examples which illustrate various applications of the present invention. These examples do not constitute a definition of all possible embodiments, and those skilled in the art will understand that the present invention is applicable to many other embodiments. Further, although the following examples are briefly described for clarity, those skilled in the art will understand how to make any changes, if necessary, to the above-described apparatus and methods to accommodate these and other embodiments and applications.

Ticket Example

Purchasers pay for tickets, such as tickets for a particular sporting event or airline flight. Purchasers may pay for the tickets with a credit card account or by other means. If all tickets (e.g., for the event or flight) are sold, each purchaser receives a rebate off of the ticket purchase price. Those purchasers that paid with a credit card account are automatically credited a predetermined portion of the ticket purchase price, while the remaining purchasers are mailed rebate checks.

Electronics Example

The first 20,000 purchasers who submit registration cards for a new digital recorder are considered early-adopter purchasers. When 1,000,000 digital recorders are sold, the early-adopter purchasers are mailed checks for the difference between the purchase price and the current price of the digital recorder.

Computer Example

Purchasers who buy a particular computer within the first month after its release are provided an access code once the computer is installed at 1,000 locations. The access code permits the purchasers to access a site on the World Wide Web where they may download free software upgrades for the computer.

Software Example

The first 100 purchasers of a graphic design program from a new ("startup") company are provided with registration codes and a telephone number. When a purchaser calls the telephone number, he is prompted to provide the corresponding registration code. Providing the code registers the purchaser, who receives a rebate check for the purchase price each time 25,000 additional copies of the graphic design program are sold.

Camera Example

Purchasers who pay for a particular digital camera with a certain type of credit card (e.g. an American Express credit card) are considered early-adopter purchasers. Once 500,000 digital cameras are sold, each of the early-adopter purchasers is provided with twenty free rolls of film.

Internet Example

The first 10,000 purchasers that buy airline tickets through an Internet site are considered early-adopter purchasers. If over 1,000,000 tickets are sold through the site, each of the early-adopter purchasers receives his next airline ticket free of charge through that site.

Magazine Example

A publisher of a new magazine provides each subscriber that subscribes within the first month with a free two-year subscription renewal once the magazine is sold to 60,000 subscribers.

Lottery Ticket Example

Purchasers that buy a lottery ticket when the top jackpot is less than $1,000,000 are considered early-adopter purchasers. If the jackpot exceeds $10,000,000 when lottery winners are selected, early-adopter purchasers with winning lottery tickets receive twice the prize ("payout") that they would have normally.

Competitor Sales Example

Every purchaser of a first video game from Company X receives a second video game for free if sales of Company X are greater than sales of Company Y during the Christmas season.

New Store Example

The first one thousand customers of a new outlet store who spend over $200 receive a $100 gift certificate once sales of that outlet reach $1,000,000.

New Credit Card Example

The first five hundred customers that are approved for a newly-offered credit card receive a portion of the aggregate monthly balance of all holders of that credit card.

Although the present invention has been described with respect to a preferred embodiment thereof, those skilled in the art will understand that various substitutions may be made to those embodiments described herein without departing from the spirit and scope of the present invention. For example, a great number of types of rewards and methods of delivering those rewards will be apparent to those skilled in the art.

The invention claimed is:

1. A method, comprising:
calculating, by a reward program central controller comprising at least one processor, a measurement of performance of a first product;
comparing, by the reward program central controller, the measurement with a predetermined value in order to evaluate success of the first product;
selecting a registration from a series of registrations, wherein the selected registration is an early-adopter registration and corresponds to an early-adopter purchaser; and
providing a reward to the early-adopter purchaser based on the evaluation of the success of the first product, wherein the reward includes a second product for which a measurement of performance of the second product is calculated.

2. The method of claim 1, wherein calculating the measurement of performance of the first product comprises calculating a quantity of sales of the first product.

3. The method of claim 1, wherein the measurement of performance of the first product is selected from the group consisting of product market share, purchase price, product revenue and product profit.

4. The method of claim 1, wherein each registration of the series of registrations has a corresponding date.

5. The method of claim 4, in which selecting the registration from the series of registrations comprises selecting the registration having a corresponding date before a predetermined date.

6. The method of claim 1, in which comparing the measurement with the predetermined value comprises comparing the measurement with a first predetermined value and comparing the measurement with a second predetermined value.

7. The method of claim 6, in which providing the reward to the early adopter purchaser comprises one of:
providing a first reward to the early-adopter purchaser of a first group based on the comparison of the measurement with the first predetermined value, and
providing a second reward to the early-adopter purchaser of a second group based on the comparison of the measurement with the second predetermined value.

8. The method of claim 1, wherein the first product is transportation to a destination and the second product is a consumer product related to the destination.

9. The method of claim 1, wherein the registration includes a corresponding purchase price, and in which providing a reward to the early-adopter purchaser further comprises, for the registration, providing to the early-adopter purchaser an amount of money based on the corresponding purchase price.

10. The method of claim 9, in which providing the reward to the early-adopter purchaser further comprises providing to the early-adopter purchaser an amount of money based on the difference between the corresponding purchase price and a current purchase price.

11. A non-transitory computer readable medium storing instructions configured to direct a central controller to perform a method, the method comprising:

calculating, by a reward program central controller comprising at least one processor, a measurement of performance of a first product;

comparing, by the central controller, the measurement with a predetermined value in order to evaluate success of the first product;

selecting a registration from a series of registrations, wherein the selected registration is an early-adopter registration and corresponds to an early-adopter purchaser; and providing a reward to the early-adopter purchaser based on the evaluation of the success of the product, wherein the reward includes a second product for which a measurement of performance of the second product is calculated.

12. The computer readable medium of claim 11, wherein calculating the measurement of performance of the first product comprises calculating a quantity of sales of the first product.

13. The computer readable medium of claim 11, wherein the measurement of performance of the first product is selected from the group consisting of product market share, purchase price, product revenue and product profit.

14. The computer readable medium of claim 11, wherein each registration of the series of registrations has a corresponding date.

15. The computer readable medium of claim 14, in which selecting the registration from the series of registrations comprises selecting the registration having a corresponding date before a predetermined date.

16. The computer readable medium of claim 11, in which comparing the measurement with the predetermined value comprises comparing the measurement with a first predetermined value, and comparing the measurement with a second predetermined value.

17. The computer readable medium of claim 16, in which providing the reward to the early adopter purchaser comprises one of:

providing a first reward to the early-adopter purchaser of a first group based on the comparison of the measurement with the first predetermined value, and providing a second reward to the early-adopter purchaser of a second group based on the comparison of the measurement with the second predetermined value.

18. The computer readable medium of claim 11, wherein the first product is transportation to a destination and the second product is a consumer product related to the destination.

19. The computer readable medium of claim 11, wherein the registration includes a corresponding purchase price, and in which providing a reward to the early-adopter purchaser further comprises, for the registration, providing to the early-adopter purchaser an amount of money based on the corresponding purchase price.

20. The computer readable medium of claim 19, in which providing the reward to the early-adopter purchaser further comprises providing to the early-adopter purchaser an amount of money based on the difference between the corresponding purchase price and a current purchase price.

* * * * *